US008347034B1

(12) United States Patent
Chen et al.

(10) Patent No.: US 8,347,034 B1
(45) Date of Patent: Jan. 1, 2013

(54) TRANSPARENT LEVEL 2 CACHE THAT USES INDEPENDENT TAG AND VALID RANDOM ACCESS MEMORY ARRAYS FOR CACHE ACCESS

(75) Inventors: Hong-Yi Chen, Fremont, CA (US); Geoffrey K. Yung, Belmont, CA (US)

(73) Assignee: Marvell International Ltd., Hamilton (BM)

(*) Notice: Subject to any disclaimer, the term of this patent is extended or adjusted under 35 U.S.C. 154(b) by 1329 days.

(21) Appl. No.: 11/034,846

(22) Filed: Jan. 13, 2005

(51) Int. Cl.
*G06F 12/00* (2006.01)
*G06F 13/00* (2006.01)

(52) U.S. Cl. ......... 711/118; 711/104; 711/122; 711/144

(58) Field of Classification Search .................. 711/100, 711/104, 117–118, 122, 128, 135, 144
See application file for complete search history.

(56) References Cited

U.S. PATENT DOCUMENTS 5,267,210 A * 11/1993 McClure et al. .............. 365/218
5,548,742 A * 8/1996 Wang et al. .................... 711/128
5,555,392 A * 9/1996 Chaput et al. ................. 711/118
5,598,550 A * 1/1997 Shen et al. ..................... 711/146
5,832,250 A * 11/1998 Whittaker ...................... 711/144
5,832,534 A * 11/1998 Singh et al. .................... 711/141
6,070,233 A * 5/2000 Whittaker ...................... 711/144
6,249,845 B1 * 6/2001 Nunez et al. .................. 711/129
6,427,188 B1 7/2002 Lyon et al.
6,449,685 B1 9/2002 Leung
6,594,741 B1 7/2003 Chang
6,970,985 B2 11/2005 Moritz
6,983,347 B2 1/2006 Arimilli et al.
2001/0049770 A1 * 12/2001 Cai et al. ....................... 711/129
2002/0007444 A1 1/2002 Freerksen et al.
2002/0069341 A1 * 6/2002 Chauvel et al. ............... 711/207
2002/0078304 A1 * 6/2002 Masri et al. ................... 711/134
2002/0124144 A1 * 9/2002 Gharachorloo et al. ...... 711/145
2002/0152420 A1 10/2002 Chaudhry et al.
2003/0023814 A1 * 1/2003 Barroso et al. ................ 711/122
2004/0103250 A1 * 5/2004 Alsup ........................... 711/118
2004/0128448 A1 7/2004 Stark et al.
2004/0215901 A1 10/2004 Gaither
2004/0260879 A1 * 12/2004 Barroso et al. ................ 711/122
2005/0188155 A1 8/2005 Schubert et al.
2006/0031708 A1 * 2/2006 Desai ............................... 714/5

OTHER PUBLICATIONS

ARM920T Product Overview; 2003; ARM;p. 3.*
U.S. Appl. No. 11/034,677, filed Jan. 13, 2005, entitled, "Transparent Level 2 Cache Controller", 40 pages.
ARM, Inc. "ARM920T System-on-Chip Open OS Processor." ARM Product Overview (Jan. 2003): pp. 1-12.

* cited by examiner

*Primary Examiner* — Tuan V. Thai

(57) ABSTRACT

A computer cache for a memory comprises a data random-access memory (RAM) containing a plurality of cache lines. Each of the cache lines stores a segment of the memory. A tag RAM contains a plurality of address tags that correspond to the cache lines. A valid RAM contains a plurality of validity values that correspond to the cache lines. The valid RAM is stored separately from the tag RAM and the data RAM. The valid RAM is selectively independently clearable. A hit module determines whether data is stored in the computer cache based upon the valid RAM and the tag RAM.

13 Claims, 8 Drawing Sheets

Start
Idle
Cacheable?
N
Y
224
Read/Write
Read
Write
226
Bufferable?
Y
N
230
L1 hit?
Y
N
228
L2 hit?
N
Y
232
Linefill L2
236
234
L2 returns data
L1 hit?
Y
N
238
L2 hit?
Y
N
242
Write to L2
244
L1 hit?
Y
N
240
Write to L2
246
L2 hit?
N
Y
248
Write to L2
250

TRANSPARENT LEVEL 2 CACHE THAT USES INDEPENDENT TAG AND VALID RANDOM ACCESS MEMORY ARRAYS FOR CACHE ACCESS

CROSS-REFERENCE TO RELATED APPLICATIONS

This application is related to U.S. Ser. No. 11/034,677 filed Jan. 13, 2005, entitled “Transparent Level 2 Cache Controller”. The disclosure of the above application is hereby incorporated by reference in its entirety.

FIELD OF THE INVENTION

The present invention relates to cache memory.

BACKGROUND OF THE INVENTION

As main memories continue to grow larger and processors run faster, the disparity in their operating speeds has widened. As a result, a cache that bridges the gap by storing a portion of main memory in a smaller and faster structure has become increasingly important. When the processor core needs data, it first checks the cache. If the cache presently contains the requested data (a cache hit), it can be retrieved far faster than resorting to main memory (a cache miss).

There are often multiple caches between the processing core and main memory in what is referred to as a memory hierarchy. Referring to FIG. 1A, a generic two level cache architecture 10 is shown. A processing core 12 communicates with a level one (L1) cache 14 which in turn communicates with a level two (L2) cache 16. The L2 cache 16 communicates with main memory 18. Hierarchies including even a third (L3) cache are not uncommon. The hierarchy levels nearest the processing core 12 are the fastest, but store the least amount of data.

In a typical 32-bit system, each individual 32-bit address refers to a single byte of memory. Many 32-bit processors access memory one word at a time, where a word is equal to four bytes. Caches usually store data in groups of words called cache lines. For illustrative purposes, consider an exemplary cache having eight words per cache line. The four addressable bytes in each word require that the two least significant bits ($2^2=4$ bytes in each word) in the 32-bit address select a particular byte from a word. With eight words in a cache line, the next three least significant bits ($2^3=8$ words in each line) in the address select a word from a given cache line.

A cache contains storage space for a limited number of cache lines. The cache controller must therefore decide which lines of memory are to be stored in the cache and where they are to be placed. In the most straightforward placement method, direct mapping, there is only one location in the cache where a given line of memory may be stored. In a two-way set-associative cache, there are two locations in the cache where a given line of memory may be stored. Similarly, in an n-way set associative cache, there are n locations in the cache where a specific line of memory may be stored. In the extreme case, n is equal to the number of lines in the cache, the cache is referred to as fully associative, and a line of memory may be stored in any location within the cache.

Direct mapping generally uses the low order bits of the address to select the cache location in which to store the memory line. For instance, if there are $2^k$ cache lines, k low order address bits determine which cache location to store the data from the memory line into. These k address bits are often referred to as the index. Because many memory lines map to the same cache location, the cache must also store an address tag to signify which memory line is currently stored at that cache location.

Returning to the exemplary eight word per line cache, assume that the cache contains 4096 ($2^{12}$) cache lines. This configuration will result in a cache size of 128 KB ($2^{12}$ lines*$2^3$ words per line*$2^2$ bytes per word=$2^{17}$ bytes). With $2^{12}$ cache lines, the twelve low order address bits will be used to decide which location in the cache a memory line will be stored at. The 32-bit address space of the memory can accommodate $2^{32}$ bytes (4 GB), or $2^{27}$ cache lines. This means that there are 32,768 ($2^{27}/2^{12}=2^{15}$) memory lines that map to each cache location. A tag field must thus be included for each cache location to determine which of the $2^{15}$ memory lines is currently stored.

The five least significant bits in the address select a byte from a cache line. Three bits select a word from the cache line, and two bits select a byte within the word. Twelve bits form the index to select one of the $2^{12}$ cache lines from the cache. The fifteen-bit address tag allows the complete 32-bit address to be formed. These fields are depicted graphically in FIG. 1B.

Many computer systems currently allow the use of more memory than is physically available through the use of virtual memory. At its essence, virtual memory allows individual program processes to run in an address space that is larger than is physically available. The process simply addresses memory as if it were the only process running. This is a virtual address space unconstrained by the size of main memory or the presence of other processes. The process can access virtual memory starting at 0x0, regardless of what region of physical memory is actually allocated to the process. A combination of operating system software and physical hardware translates between virtual addresses and the physical domain. If more virtual address space is in use than exists in physical main memory, the operating system will have to manage which virtual address ranges are stored in memory, and which are located on a secondary storage medium such as magnetic disk.

Level one (L1) caches are often located on the same die as the processing core. This allows very fast communication between the two and permits the L1 cache to run at processor speed. A level two (L2) cache located off chip requires more than a single processor cycle to access data and is referred to as a multi-cycle cache. Main memory is even slower, requiring tens of cycles to access. In order for the L1 cache to operate at processor speed, the L1 cache typically uses the virtual addressing scheme of the processor. This avoids the overhead of virtual-physical translation in this critical path.

While the L1 cache is examined to determine if it contains the requested address, the virtual address is translated to a physical address. If the L1 cache does not contain the requested address, the L2 cache is consulted using the translated physical address. The L2 cache can then communicate with the bus and main memory using physical addresses.

Cache coherence is a key concern when using caches. Operations such as direct memory access (DMA) request direct access to the main memory from the processor. Data that has been cached in the L1 or L2 caches may have been changed by the processor since being read from main memory. The data subsequently read from main memory by the DMA device would therefore be outdated. This is the essence of the problem of cache coherence.

One technique for enforcing cache coherence is to implement a write-through architecture. Any change made to cached data is immediately propagated to any lower level caches and also to main memory. The disadvantage to this approach is that writing through to memory uses precious time, and may be unnecessary if further changes are going to be made prior to data being needed in main memory.

Most current cache configurations instead use write-back mode. In write-back mode, a change made to the contents of a cache is not propagated through to memory until specifically instructed to. A piece of data that has been changed in a cache but not yet propagated through to the next level of cache or to main memory is referred to as dirty. The cache location can be "cleaned" by directing the cache to be written back to the cache below or to the memory thereby making the piece of data clean, or coherent. This may happen at regular intervals, when the memory is available, or when the processor determines that a certain location of memory will need the updated value.

An analogous cache coherency problem occurs when data has been changed in main memory, and one of the caches now contains an outdated copy. The applicable lines in the cache thus need to be "flushed," or invalidated. Flushing a cache line involves marking it as invalid. When the processor next requests that data from the cache, the cache misses and must retrieve the updated data from main memory.

In order to facilitate maintaining cache coherence, some processors have a register set that allows the processor to issue cache coherency commands. If the processor believes that a piece of data is needed in main memory, the processor can issue a clean command. The clean command may be targeted to a specific cache line, or to some portion of the entire cache. The processor can also issue flush commands. This tells the cache to invalidate or flush a certain region memory, a certain cache line, or the entire cache.

SUMMARY OF THE INVENTION

A digital system that connects to a bus that employs physical addresses comprises a processing core. A level one (L1) cache communicates with the processing core. A level two (L2) cache communicates with the L1 cache. Both the L1 cache and the L2 cache are indexed by virtual addresses and tagged with virtual addresses. A bus unit communicates with the L2 cache and with the bus.

In other features, the L2 cache is write-through or direct mapped. A bus write buffer communicates with the processing core and the bus unit and stores data. An L2 write buffer communicates with the processing core and the L2 cache and stores data. A line fill buffer communicates with the bus unit and the L2 cache and stores data.

A digital system that connects to a bus that employs a first address domain comprises a processing core. A level one (L1) cache communicates with the processing core. A level two (L2) cache communicates with the L1 cache. Each of the processing core, the L1 cache, and the L2 cache employ a second addressing domain. A bus unit communicates with the L2 cache and with the bus. The bus unit employs the first addressing domain.

In other features, the first addressing domain is physical and the second addressing domain is virtual. The L2 cache is write-through or direct mapped. A bus write buffer stores and communicates data from the processing core to the bus unit. An L2 write buffer stores and communicates data from the processing core to the L2 cache. A line fill buffer stores and communicates data from the bus unit to the L2 cache.

A computer cache for a memory comprises a data random-access memory (RAM) containing a plurality of cache lines. Each of the cache lines stores a segment of the memory. A tag RAM contains a plurality of address tags that correspond to the cache lines. A valid RAM contains a plurality of validity values that correspond to the cache lines. The valid RAM is stored separately from the tag RAM and the data RAM. The valid RAM is selectively independently clearable. A hit module determines whether data is stored in the computer cache based upon the valid RAM and the tag RAM.

A computer cache for accessing portions of a memory comprises a data random-access memory (RAM) containing a plurality of cache lines. Each of the cache lines stores a segment of the memory. Each of the cache lines is referenced by an n-bit index. Each of the cache lines is associated with an m-bit address tag. A tag RAM contains a plurality of p-bit address labels that store p most significant bits of the address tags. A valid RAM contains a validity value for each of the cache lines. Each of the address labels corresponds to k validity values.

In other features, p is equal to m minus x. x is an integer greater than or equal to one. Each of the address labels corresponds to k cache lines. k is equal to two times x. The valid RAM is stored separately from the tag RAM and the data RAM. The valid RAM is selectively independently clearable.

A transparent level two (L2) cache for a processing core and L1 cache that use a first index and first address tags during a first mode of cache addressing comprises a data random-access memory (RAM) that stores data from the memory as a plurality of cache lines. The cache lines are accessed via the first index. A tag RAM stores the first address tags for the cache lines. A valid RAM stores a validity value for each of the cache lines. A cache coherence instruction interpreter selectively clears the valid RAM based upon at least one of the first index and/or a match of one of the first address tags.

In other features, an L2 write buffer stores and communicates data from the processing core to the L2 cache. The cache coherence instruction interpreter selectively instructs the L2 write buffer to flush. The cache coherence instructions are Advanced RISC Machines CP15 instructions. The L2 cache is write-through or direct mapped.

A method for operating a digital system that connects to a bus that employs physical addresses comprises providing a processing core. A level one (L1) cache communicates with the processing core. A level two (L2) cache communicates with the L1 cache. Both the L1 cache and the L2 cache are indexing using virtual addresses. Both the L1 cache and the L2 cache are tagged with virtual addresses. A bus unit communicates with the L2 cache and with the bus.

In other features, the L2 cache is write-through or directly mapped. Data is stored in a bus write buffer that communicates with the processing core and the bus unit. Data is stored in an L2 write buffer that communicates with the processing core and the L2 cache. Data is stored in a line fill buffer that communicates with the bus unit and the L2 cache.

A method of operating a digital system that connects to a bus that employs a first address domain comprises providing a processing core, a level one (L1) cache that communicates with the processing core, and a level two (L2) cache that communicates with the L1 cache. A second addressing domain is employed for each of the processing core, the L1 cache, and the L2 cache. A first addressing domain is employed for a bus unit communicates with the L2 cache and with the bus.

In other features, the first addressing domain is physical and the second addressing domain is virtual. The L2 cache is write-through or direct mapped. Data is stored and communicated from the processing core to the bus unit using a bus write buffer. Data is stored and communicated from the processing core to the L2 cache using an L2 write buffer. Data is stored and communicated from the bus unit to the L2 cache using a line fill buffer.

A method for operating a computer cache for a memory comprises providing a data random-access memory (RAM) containing a plurality of cache lines. A segment of the memory is stored in each of the cache lines. A plurality of address tags are stored that correspond to the cache lines in a tag RAM. A plurality of validity values are stored that correspond to the cache lines a valid RAM. The valid RAM is stored separately from the tag RAM and the data RAM. The valid RAM is selectively independently cleared. Data is selectively stored in the computer cache based upon the valid RAM and the tag RAM.

A method for operating a computer cache for a memory comprises providing a data random-access memory (RAM) containing a plurality of cache lines. A segment of the memory is stored in each of the cache lines. A plurality of address tags that correspond to the cache lines are stored in a tag RAM. A plurality of validity values that correspond to the cache lines are stored in a valid RAM. The valid RAM is stored separately from the tag RAM and the data RAM. The valid RAM is selectively independently cleared. Data is selectively stored in the computer cache based upon the valid RAM and the tag RAM.

A method for operating a computer cache for providing access to portions of a memory comprises providing a data random-access memory (RAM) containing a plurality of cache lines. A segment of the memory is stored in each of the cache lines. Each of the cache lines is referenced by an n-bit index. Each of the cache lines is associated with an m-bit address tag. p most significant bits of the address tags are stored in a tag RAM containing a plurality of p-bit address labels. A validity value is stored for each of the cache lines. Each of the address labels corresponds to k validity values.

In other features, p is equal to m minus x. x is an integer greater than or equal to one. Each of the address labels corresponds to k cache lines. k is equal to two times x. The valid RAM is stored separately from the tag RAM and the data RAM. The valid RAM is selectively independently cleared.

A method for operating a transparent level two (L2) cache for a processing core and L1 cache that use a first index and first address tags during a first mode of cache addressing comprises providing a data random-access memory (RAM) that stores data from the memory as a plurality of cache lines. The cache lines are accessed via the first index. The first address tags for the cache lines are stored in a tag RAM. A validity value for each of the cache lines is stored in a valid RAM. The valid RAM is selectively independently cleared based upon at least one of the first index and/or a match of one of the first address tags.

In other features, data is stored and communicated from the processing core to the L2 cache using an L2 write buffer. The L2 write buffer is selectively instructed to flush. The L2 cache is write-through or direct mapped.

A digital system that connects to a bus that employs physical addresses comprises processing core means for processing. Level one (L1) cache means stores data and communicates with the processing core. Level two (L2) cache means stores data and communicates with the L1 cache. Both the L1 cache means and the L2 cache means are indexed by virtual addresses and tagged with virtual addresses. Bus means communicates with the L2 cache means and with the bus.

In other features, the L2 cache means is write-through or direct mapped. Bus write buffer means stores data and communicates with the processing core and the bus unit. L2 write buffer means stores data and communicates with the processing core and the L2 cache. Line fill buffer means stores data and communicates with the bus unit and the L2 cache.

A digital system that connects to a bus that employs a first address domain comprises processing core means for processing. Level one (L1) cache means stores data and communicates with the processing core means. Level two (L2) cache means stores data and communicates with the L1 cache means. Each of the processing core means, the L1 cache means, and the L2 cache means employ a second addressing domain. Bus means communicates with the L2 cache means and with the bus and employs the first addressing domain.

In other features, the first addressing domain is physical and the second addressing domain is virtual. The L2 cache means is write-through or direct mapped. Bus write buffer means stores and communicates data from the processing core means to the bus means. L2 write buffer means stores and communicates data from the processing core means to the L2 cache means. Line fill buffer means stores and communicates data from the bus means to the L2 cache means.

A computer cache for a memory comprises data storing means that includes a plurality of cache lines and that stores a segment of the memory. Tag storing means stores a plurality of address tags that correspond to the cache lines. Valid storing means stores a plurality of validity values that correspond to the cache lines. The valid storing means is stored separately from the tag storing means and the data storing means. The valid storing means is selectively independently clearable. Hit means determines whether data is stored in the computer cache based upon the valid storing means and the tag storing means.

A computer cache for providing access to portions of a memory comprises data storing means containing a plurality of cache lines that store a segment of the memory, that are referenced by an n-bit index, and that are associated with an m-bit address tag. Tag storing means contains a plurality of p-bit address labels that store p most significant bits of the address tags. Valid storing means containing a validity value for each of the cache lines. Each of the address labels corresponds to k validity values.

In other features, p is equal to m minus x. x is an integer greater than or equal to one. Each of the address labels corresponds to k cache lines. k is equal to two times x. The valid storing means is stored separately from the tag storing means and the data storing means. The valid storing means is selectively independently clearable.

A transparent level two (L2) cache for a processing core and L1 cache that use a first index and first address tags during a first mode of cache addressing comprises data storing means that stores data from the memory as a plurality of cache lines that are accessed via the first index. Tag storing means stores the first address tags for the cache lines. Valid storing means stores a validity value for each of the cache lines. Cache coherence means selectively clears the valid storing means based upon at least one of the first index and/or a match of one of the first address tags.

In other features, L2 write buffer means stores and communicates data from the processing core means to the L2 cache. The cache coherence means selectively instructs the L2 write buffer means to flush. The L2 cache is write-through or direct mapped.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1A:
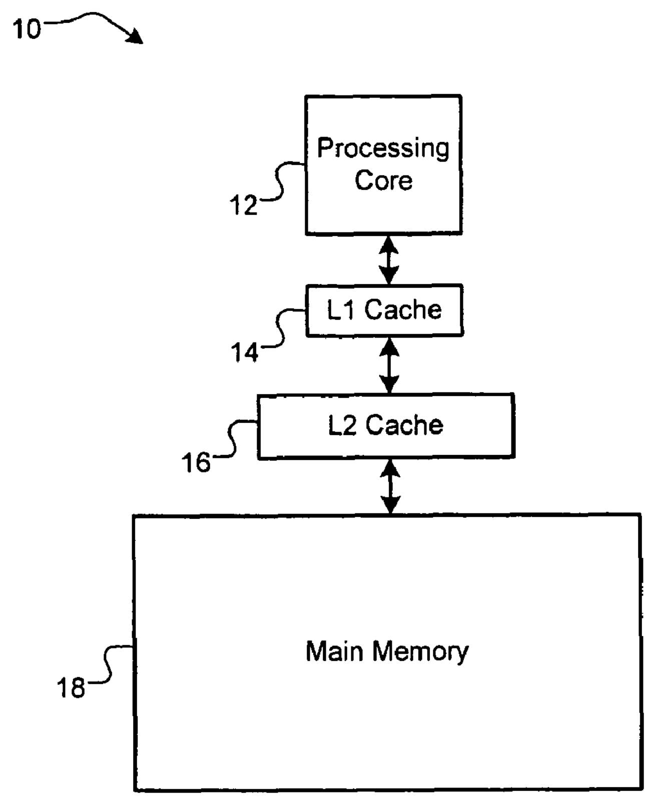
FIG. 1A is a block diagram of a generic two level cache architecture according to the prior art.
Figure 1B:
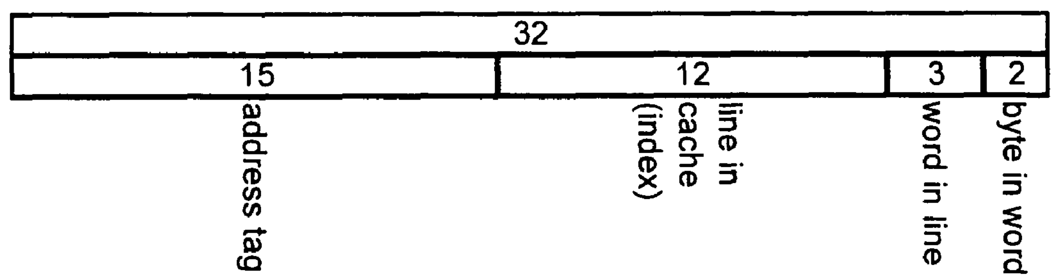
FIG. 1B is a graphical depiction of address fields within a cache according to the prior art.

The following description of the preferred embodiments is merely exemplary in nature and is in no way intended to limit the invention, its application, or uses. For purposes of clarity, the same reference numbers will be used in the drawings to identify similar elements.

A system with only a level one (L1) cache will generally recognize a performance improvement when a level 2 (L2) cache is added. Normally, this entails operating system and/or driver changes for a number of reasons. Because the L2 cache is physically addressed, as opposed to the virtual addressing of the processor and L1 cache, the translation process must be accounted for. Cache coherence commands are difficult to adapt between the physical and virtual domains. The additional level of cache may create further cache coherency and delay problems.

Figure 2:
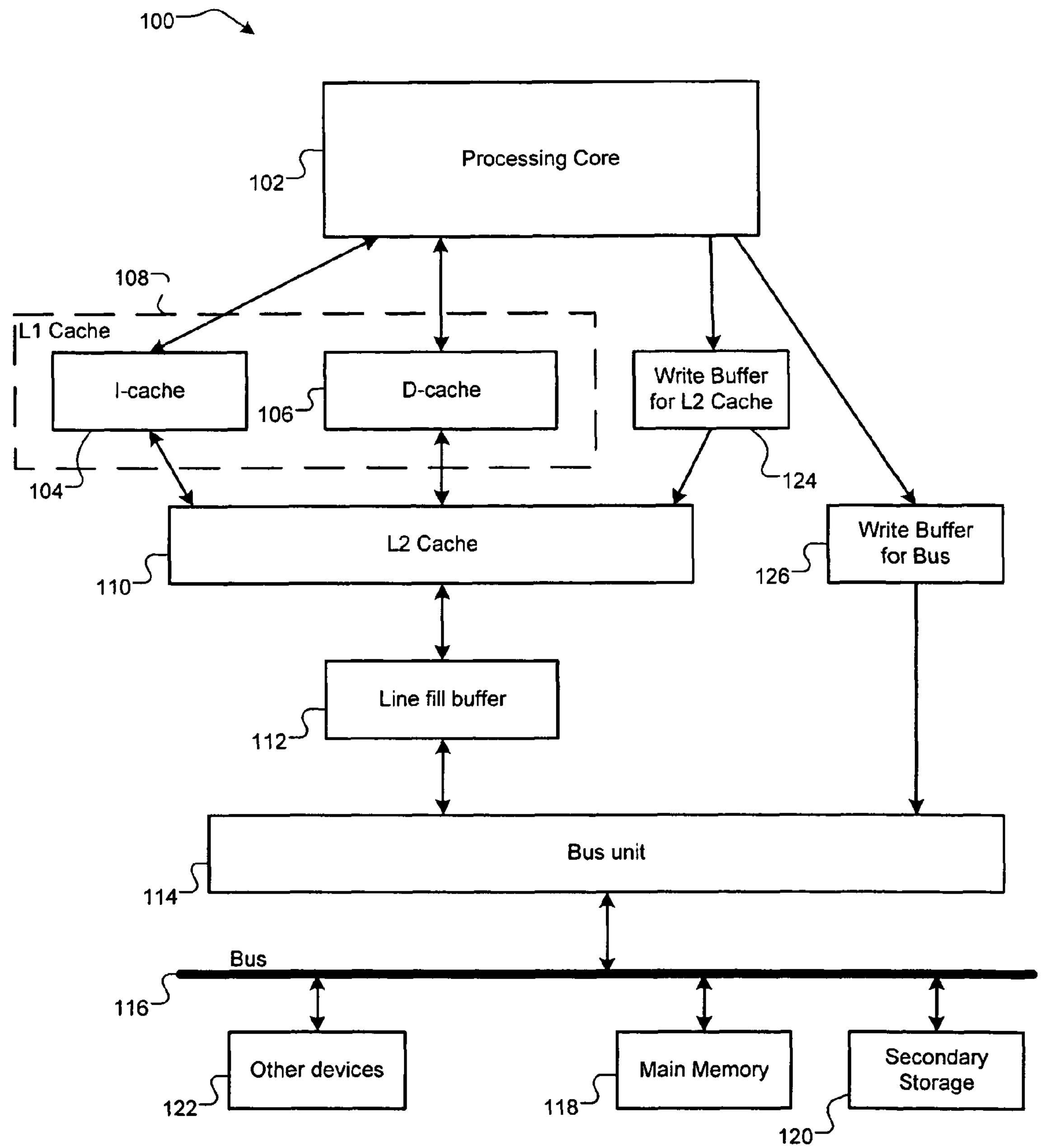
FIG. 2 is a block diagram of an exemplary computer system according to the principles of the present invention.

An exemplary L2 cache controller according to the principles of the present invention uses virtual address tags and virtual indexing for the L2 cache. Referring now to FIG. 2, a block diagram of an exemplary computer system 100 according to the principles of the present invention is presented. A processing core 102 communicates with an I-cache 104 and a D-cache 106, which together form an L1 cache 108. The I-cache 104 and D-cache 106 communicate with an L2 cache 110. The L2 cache 110 communicates with a line fill buffer 112, and the line fill buffer 112 communicates with a bus unit 114. The bus unit 114 communicates with a bus 116, which communicates with main memory 118, secondary storage 120 (such as a hard disk drive), and other devices 122 (which may require direct memory access). The processing core 102 communicates data to an L2 write buffer 124, and to a bus write buffer 126. The L2 write buffer 124 communicates data to the L2 cache 110, while the bus write buffer 126 communicates data to the bus unit 114.

Figure 3:
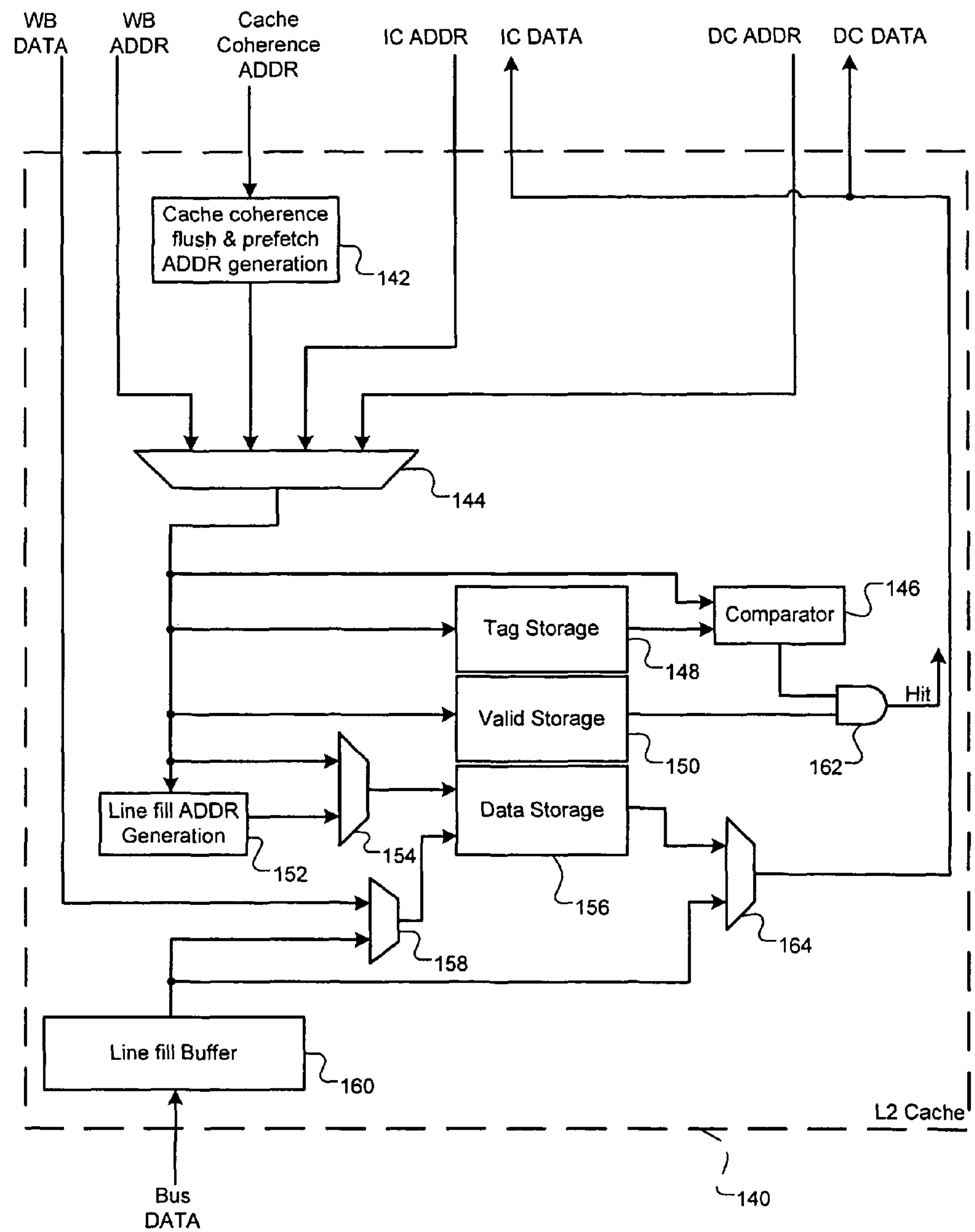
FIG. 3 is a datapath of an exemplary implementation of a level two cache according to the principles of the present invention.

Referring now to FIG. 3, a datapath for an exemplary implementation of a level two (L2) cache 140 according to the principles of the present invention is presented. A cache coherence address generation module 142 receives a cache coherence address. A first multiplexer (MUX) 144 receives a write buffer address, an instruction cache address, and a data cache address. The first MUX 144 also receives an output from the cache coherence address generation module 142. An output of the first MUX 144 is communicated to a comparator 146, a tag storage device 148, a valid storage device 150, a line fill address generation module 152, and a second MUX 154. The second MUX 154 receives output from the line fill address generation module 152 and communicates an output of the second MUX 154 to a data storage device 156. A third MUX 158 receives write buffer data and receives output from a line fill buffer 160. The line fill buffer 160 receives bus data. An output of the third MUX 158 is communicated to the data storage device 156.

An output of the tag storage device 148 is output to the comparator 146. The result of the comparator 146 operation is communicated to an AND gate 162. An output of the valid storage device 150 is communicated to the AND gate 162. An output of the AND gate 162 signifies a hit. Output of the data storage device 156 is communicated to a fourth MUX 164. The output of the line fill buffer 160 is also communicated to the fourth MUX 164. An output of the fourth MUX 164 is communicated as instruction cache data and data cache data.

Tag storage, valid storage, and data storage are shown separately, although one skilled in the art will recognize that they are often not physically stored separately. In a preferred embodiment, the tag storage, valid storage, and data storage are accessible separately. In particular, the valid storage is clearable separately, although one skilled in the art will recognize that this is not necessary for the L2 cache controller to perform correctly. The first MUX 144 controls whether an address request for the L2 cache 140 will come from the write buffer, a cache coherence instruction, the instruction cache, or the data cache.

The second MUX 154 selects between the address provided by the first MUX 144 and a series of addresses provided by the line fill address generation module 152. The line fill address generation module 152 provides a series of addresses when an entire cache line is read into the data storage device 156 from the line fill buffer 160. The third MUX 158 selects between the data from the write buffer and the data from the line fill buffer 160. The second MUX 154 and third MUX 158 are therefore controlled in unison.

The fourth MUX 164 selects between data from the data storage device 156 and data from the line fill buffer 160. If the L2 cache did not contain the data sought by the L1 cache, the L2 cache will read it from the bus unit 114. The fourth MUX 164 allows the data being retrieved from the bus unit 114 to be relayed immediately to the instruction or data cache as it is being stored in the data storage device 156. To determine an L2 cache hit, the comparator 146 compares the tag field from the first MUX 144 with the output of the tag storage device 148. If the tags match, and the appropriate valid information in the valid storage device 150 indicates that the cache line is valid, the AND gate 162 communicates that there is an L2 cache hit. This signifies that the data being output from the fourth MUX 164 is valid for the instruction and data caches to latch.

Figure 4:
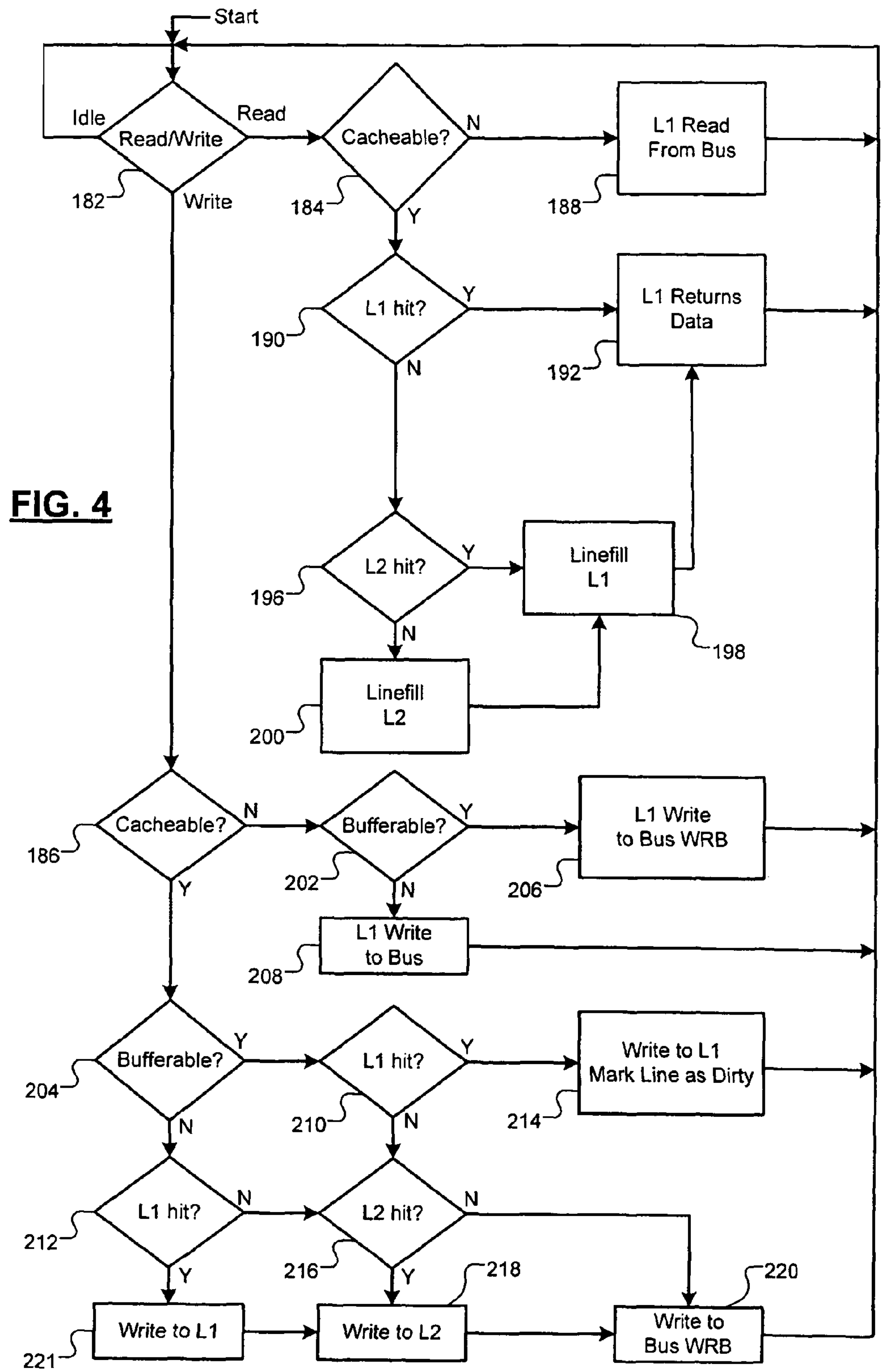
FIG. 4 is a flow chart of exemplary steps performed by a combination of L1 and L2 cache to implement read/write commands, according to the principles of the present invention.

Referring now to FIG. 4, a flow chart presents exemplary steps performed by a combination of L1 and L2 cache to implement read/write commands, according to the principles of the present invention. Control begins at step 182 and remains in step 182 while the caches are idle. If a received command is a read, control transfers to step 184; otherwise, if the command is a write, control transfers to step 186. If the read is not cacheable in step 184, control transfers to step 188. If the read is cacheable, control transfers to step 190. In step 188, the L1 cache reads data from the bus. Control then returns to step 182.

In step 190, control determines whether there is a hit in the L1 cache. If there is a hit in the L1 cache, control transfers to step 192; otherwise control transfers to step 196. In step 192, the L1 cache returns data and control returns to step 182. The L1 cache requests a physical address translation from a memory management unit, and control continues at step 196. In step 196, if there is a hit in the L2 cache, control transfers to step 198; otherwise control transfers to step 200. In step 200, the L2 cache is line filled from the bus. Control then transfers to step 198. In step 198, the L1 cache is line filled from the L2 cache, and control transfers to step 192.

In step 186, if the write is not cacheable, control transfers to step 202; otherwise, control transfers to step 204. In step 202, if the write is bufferable, control transfers to step 206; otherwise control transfers to step 208. In step 206, the L1 cache writes to the bus write buffer, and control returns to step 182. In step 208, the L1 cache writes to the bus directly and control returns to step 182.

In step 204, if the write is bufferable, control transfers to step 210; otherwise control transfers to step 212. In step 210, if there is a hit in the L1 cache, control transfers to step 214; otherwise control transfers to step 216. In step 214, data is written to the L1 cache, and the line is marked as dirty. Control then returns to step 182. In step 216, if there is a hit in the L2 cache, control transfers to step 218; otherwise control transfers to step 220. In step 218, data is written to the L2 cache, and control continues with step 220. In step 220, data is written to the bus write buffer and control returns to step 182. In step 212, if there is an L1 hit, control transfers to step 221; otherwise, control transfers to step 216. In step 221, data is written to the L1 cache and control continues with step 218.

Figure 5:
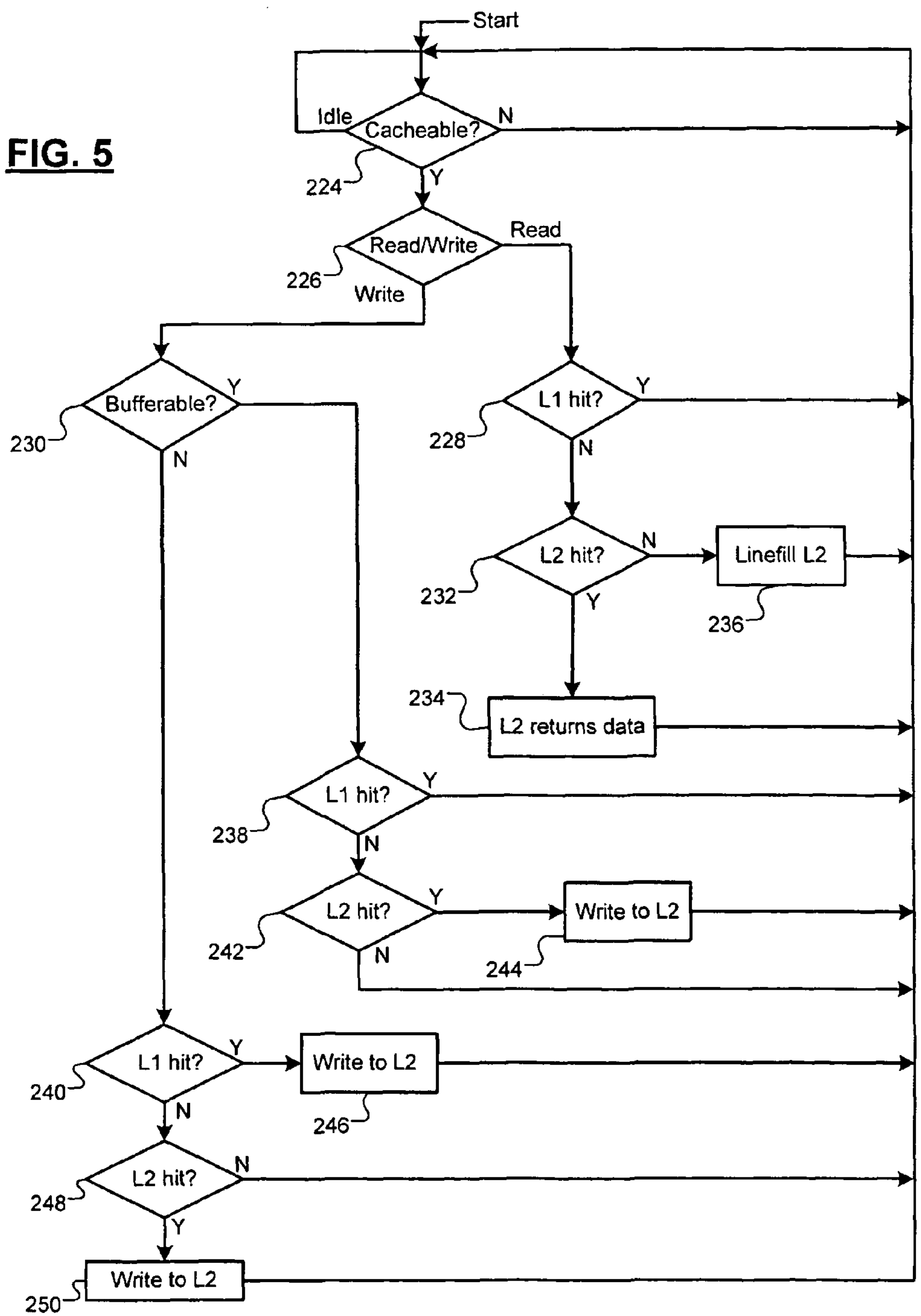
FIG. 5 is a flow chart of exemplary steps performed by the level 2 cache alone to implement read/write commands.

Referring now to FIG. 5, a flow chart depicts exemplary steps performed by the level 2 cache alone to implement read/write commands. Control begins in step 224. If no read/write command is received, or the read/write command is not cacheable, control remains in step 224. If the read/write command is cacheable, control transfers to step 226. In step 226, if the read/write command is a read, control transfers to step 228; otherwise control transfers to step 230. In step 228, if there is a hit in the L1 cache, control returns to step 224; otherwise, control transfers to step 232. If there is an L2 cache hit in step 232, control transfers to step 234; otherwise control transfers to step 236. In step 234, the L2 cache returns data and control returns to step 224. In step 236, the L2 cache is line filled and the L2 cache returns data and control returns to step 224.

Referring now to step 230, if the write is bufferable, control transfers to step 238; otherwise control transfers to step 240. In step 238, if there is an L1 hit, control returns to step 224; otherwise control transfers to step 242. In step 242, if there is an L2 hit, control transfers to step 244; otherwise control returns to step 224. In step 244, data is written to the L2 cache and control returns to step 224. In step 240, if there is an L1 cache hit, control transfers to step 246; otherwise control transfers to step 248. In step 246, data is written to the L2 cache and control returns to step 224. In step 248, if there is not an L2 cache hit, control returns to step 224. Otherwise, control transfers to step 250 where data is written to the L2 cache, and control returns to step 224.

Figure 6:
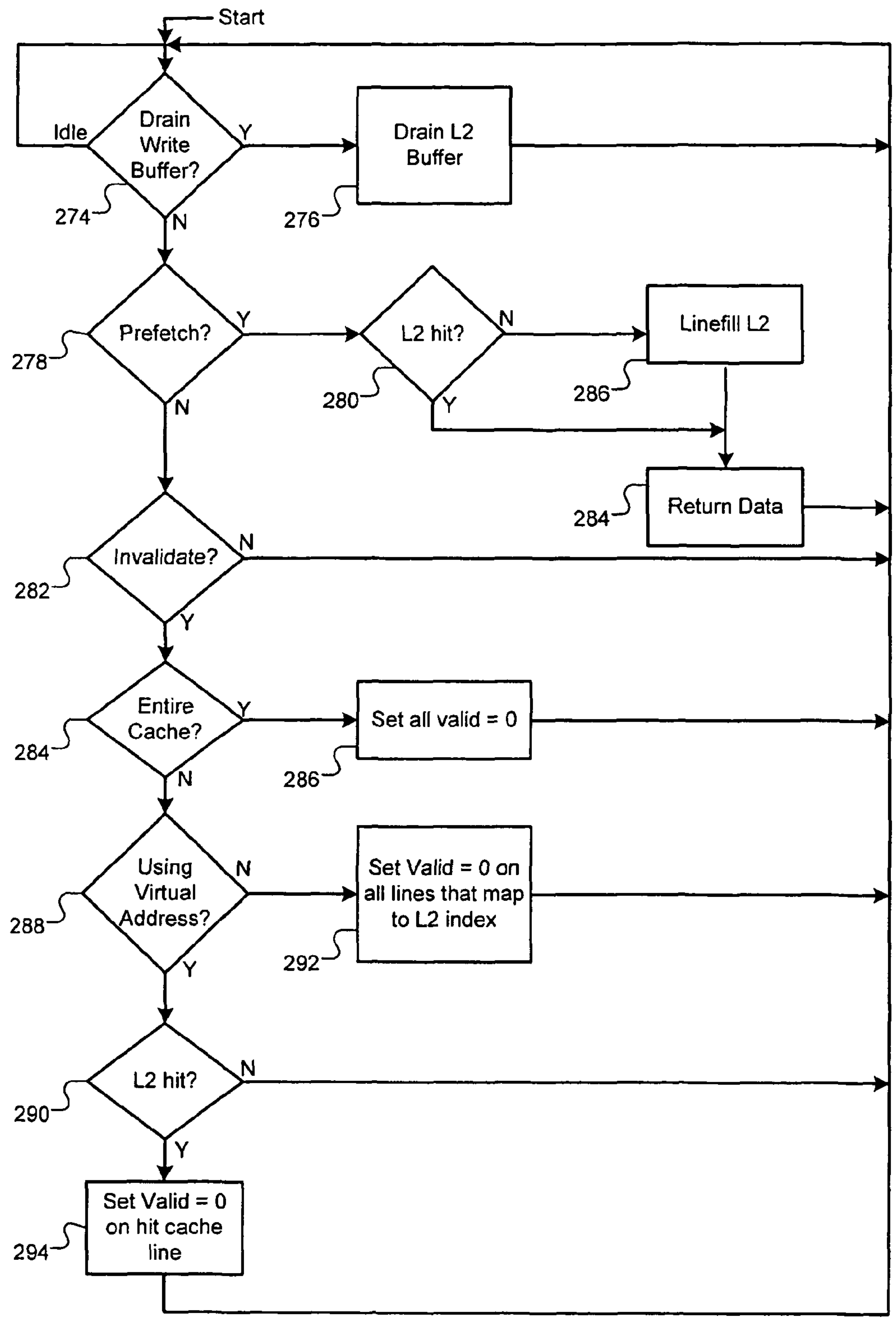
FIG. 6 is a flow chart of exemplary steps performed by an exemplary L2 cache in response to cache coherence instructions according to the principles of the present invention.

Referring now to FIG. 6, a flow chart depicts exemplary steps performed by an exemplary L2 cache in response to cache coherence instructions according to the principles of the present invention. Control begins at step 274 and remains in step 274 while there is no cache coherence command. If the command is to drain the write buffer, control transfers to step 276; for any other command, control transfers to step 278. In step 276, the L2 write buffer is drained and control returns to step 274. In step 278, if the instruction is a prefetch, control transfers to step 280; otherwise control transfers to step 282. In step 280, if there is an L2 hit on the prefetched line, control transfers to step 284; otherwise control transfers to step 286. In step 286, the L2 cache is line filled from the bus unit, and control continues with step 284. In step 284, data is returned from the L2 cache and control returns to step 274.

In step 282, if the command is invalidate, control transfers to step 284. If the instruction is not invalidate, no action is required by the L2 cache, and control returns to step 274. In step 284, if the invalidate instruction is for the entire cache, control transfers to step 286; otherwise control transfers to step 288. In step 286, the L2 cache sets all valid entries to zero and control returns to step 274. In step 288, if the invalidate command uses a virtual address; control transfers to step 290; otherwise control transfers to step 292. In step 292, because the invalidate instruction is not using a virtual address, it is using an index of the L1 cache. The L2 cache must therefore set the valid information to zero on all lines of the L2 cache that map to the specified L1 cache index. Control then returns to step 274. In step 290, if there is an L2 hit, control transfers to step 294; otherwise control returns to step 274. In step 294, the valid data is set to zero on whichever L2 cache line registered the hit. Control then returns to step 274.

Figure 7:
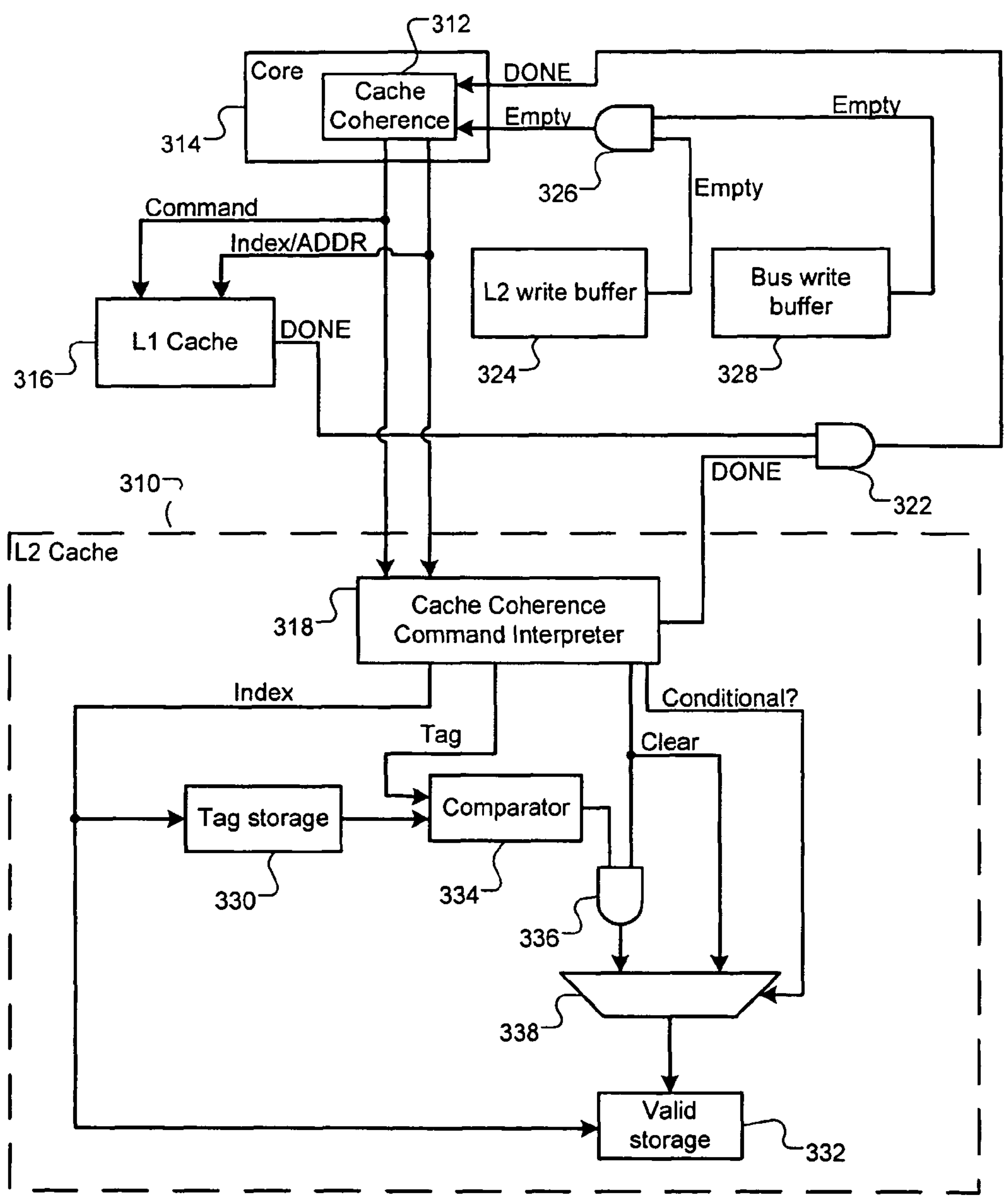
FIG. 7 is a block diagram of an exemplary implementation of the handling of cache coherence instructions within an L2 cache according to the principles of the present invention.

Referring now to FIG. 7, a block diagram of an exemplary implementation of the handling of cache coherence instructions within an L2 cache 310 according to the principles of the present invention is depicted. A processing core 312 contains a cache coherence control module 314. The cache coherence control module 314 communicates a command and an index or address to an L1 cache 316 and to a cache coherence command interpreter 318 within the L2 cache 310. When the cache coherence command interpreter 318 has concluded a command, a DONE signal is transmitted to a first AND gate 322. The L1 cache also transmits a DONE signal to the first AND gate 322. An output DONE' of the first AND gate is transmitted to the cache coherence control module 314. An L2 write buffer 324 communicates an empty signal to a second AND gate 326 when the L2 write buffer 324 is empty. Likewise, a bus write buffer 328 communicates an empty signal to the second AND gate 326 when the bus write buffer 328 is empty. An output empty of the second AND gate 326 is communicated to the cache coherence control module 314.

The cache coherence command interpreter 318 communicates a cache index to a tag storage device 330 and to a valid storage device 332. The cache coherence command interpreter 318 communicates an address tag to a comparator 334. The tag storage device 330 outputs an address tag to the comparator 334. An output of the comparator 334 is communicated to a third AND gate 336. The cache coherence command interpreter 318 transmits a clear signal to the third AND gate 336 and to a multiplexer (MUX) 338. The cache coherence command interpreter 318 also transmits a conditional signal to a selection input of the MUX 338. A selected output of the MUX 338 is communicated to the valid storage device 332.

In this implementation, commands issued to the cache coherence control module 314 do not have to be altered to allow cache coherence control of the L2 cache. Operation of the L2 cache with regard to cache coherence instructions is transparent to programs running on the processing core 312. For example, a cache coherence controller normally waits for the bus write buffer to empty when a drain write buffer command has been issued. In the current architecture, the empty signal from the bus write buffer 328 is combined with the empty signal from the L2 write buffer 324 using the second AND gate 326. When the cache coherence controller 312 receives the resulting empty' signal, the program requesting the write buffer drain from the cache coherence control module 314 does not need to know that both write buffers, 324 and 328, have been emptied. The program simply thinks that the requested bus write buffer 328 has been drained. Similarly, the first AND gate 322 produces a DONE' signal from the DONE signals of the L1 cache 316 and the L2 cache coherence command interpreter 318.

The cache coherence command interpreter is responsible for clearing valid bits in the valid storage device 332 of the L2 cache 310. A clear signal and cache index are sent to the valid storage device 332. The MUX 338 selects whether the clear signal or a conditional clear signal is transmitted to the valid storage device 332. If the cache coherence command seeks to invalidate only a certain address, a tag check must first be accomplished. This is the function of the comparator 334. The selected cache line within the valid storage device 332 is then cleared only if the L2 cache 310 contains the specified memory address.

Figure 8A:
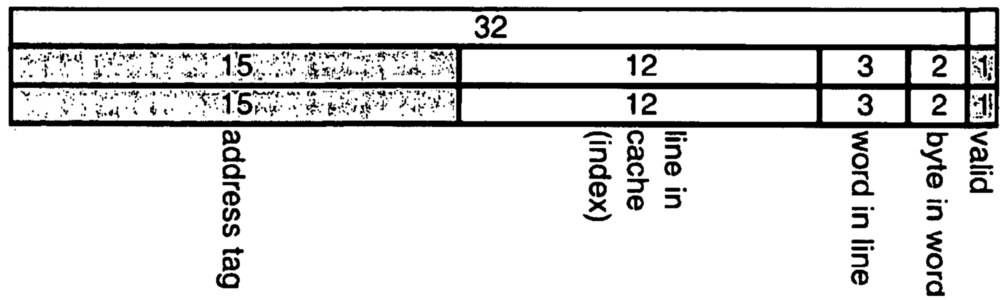
FIG. 8A is a graphical depiction of address fields and tag bits for a pair of cache lines according to the prior art.

In traditional direct mapped caches, the cache stores an address tag and a valid bit for each cache line. When combined with the index of the cache line (the cache lines are numbered sequentially using an index), the memory address of the cache line is obtained. The least significant bits select a particular byte from the chosen cache line. FIG. 8A is a graphical depiction of address fields and tag bits for a pair of cache lines. In an example 128 KB cache with eight words per line, 15 bits store an address tag for each cache line, and one valid bit stores validity information for each cache line. For two cache lines, thirty-two (15*2+1*2) bits are used to store address tag and validity information, as shown shaded in FIG. 8A.

Figure 8B:
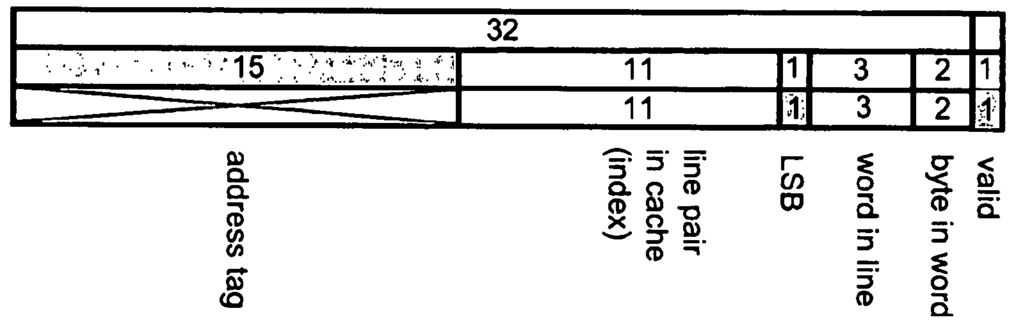
FIG. 8B is a graphical depiction of address fields and tag bits for a pair of cache lines according to the principles of the present invention.

FIG. 8B is a graphical depiction of address fields and tag bits for a pair of cache lines according to the principles of the present invention. In an embodiment of the present invention, multiple cache lines can share the same address tag. For a 128 KB cache, the $2^{12}$ cache lines can be organized into $2^{11}$ cache line pairs. To form a full cache line address, a 16 bit address tag is needed. The cache line pair shares the most significant 15 bits of the address tag. The first cache line in the cache line pair corresponds to the least significant bit (LSB) of the cache index being 0, while the second cache line corresponds to the LSB being 1.

In order to store two cache lines, the cache according to the principles of the present invention need store only 17 bits (15+2*1). This represents a reduction in tag storage by nearly half from the 32 bits needed in the prior art. The stored tag and validity information is shown shaded in FIG. 8B.

In a preferred embodiment, the validity information of the cache is stored separately from tag information and data information so that the validity information can be cleared independently. The cache can be invalidated quickly by setting all validity information to an invalid state.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A computer cache for a processor memory, the computer cache comprising:

a data random-access memory (RAM) comprising a plurality of cache lines, wherein each of the cache lines is configured to store a segment of the processor memory;

a tag RAM comprising a plurality of address tags that correspond to respective ones of the cache lines;

a valid RAM comprising a plurality of validity values that correspond to the respective ones of the cache lines, the valid RAM configured to receive a clear signal and a conditional clear signal, wherein data within the valid RAM is stored separately from i) data within the tag RAM and ii) data within the data RAM, and wherein the valid RAM is selectively independently clearable relative to the tag RAM based on whether the valid RAM receives the clear signal or the conditional clear signal; and a hit module configured to determine, based on the data within the valid RAM and the data within the tag RAM, whether valid data is stored in the computer.

2. The computer cache of claim 1, further comprising a write buffer configured to store and communicate data from a processing core to the computer cache.

3. The computer cache of claim 2, further comprising a cache coherence instruction interpreter configured to selectively instruct the write buffer to flush.

4. The computer cache of claim 3, wherein the cache coherence instruction interpreter is configured to use reduced instruction set computer (RISC) instructions.

5. The computer cache of claim 1, wherein the computer cache is write-through.

6. The computer cache of claim 1, wherein the computer cache is direct mapped.

7. The computer cache of claim 1, wherein the tag RAM comprises N address tags that correspond to the cache lines, wherein the valid RAM comprises M valid bits that correspond to the cache lines, and wherein M<N, and wherein M and N are integers greater than or equal to 1.

8. The computer cache of claim 1, wherein the valid RAM is selectively independently clearable by setting all of the validity values to zero in at least one of a single read operation and a single write operation.

9. A method for operating a computer cache for a processor memory, wherein the computer cache includes a data random-access memory (RAM) comprising a plurality of cache lines, the method comprising:

storing a segment of the processor memory in each of the cache lines;

storing a plurality of address tags that correspond to respective ones of the cache lines in a tag RAM;

storing a plurality of validity values that correspond to the respective ones of the cache lines in a valid RAM configured to receive i) a clear signal and ii) a conditional clear signal;

storing data within the valid RAM separately from i) data within the tag RAM and ii) data within the data RAM;

selectively independently clearing the valid RAM relative to the tag RAM based on whether the valid RAM receives the clear signal or the conditional clear signal; and determining, based on the data within the valid RAM and the data within the tag RAM, whether valid data is stored in the computer cache.

10. The method of claim 9, further comprising storing and communicating data from a processing core to the computer cache using a write buffer.

11. The method of claim 10, further comprising selectively instructing the write buffer to flush.

12. The method of claim 9, wherein the computer cache is write-through.

13. The method of claim 9, wherein the computer cache is direct mapped.

* * * * *

UNITED STATES PATENT AND TRADEMARK OFFICE

CERTIFICATE OF CORRECTION

PATENT NO. : 8,347,034 B1
APPLICATION NO. : 11/034846
DATED : January 1, 2013
INVENTOR(S) : Hong-Yi Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 680 days.

Signed and Sealed this
Twenty-ninth Day of December, 2015

Michelle K. Lee
*Director of the United States Patent and Trademark Office*